United States Patent
Yoshimura

(10) Patent No.: US 12,251,664 B2
(45) Date of Patent: Mar. 18, 2025

(54) RO ELEMENT WITH INTEGRAL PRESSURE VESSEL

(71) Applicant: Steven T. Yoshimura, Torrance, CA (US)

(72) Inventor: Steven T. Yoshimura, Torrance, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 1467 days.

(21) Appl. No.: 16/271,342

(22) Filed: Feb. 8, 2019

(65) Prior Publication Data

US 2019/0247795 A1 Aug. 15, 2019

Related U.S. Application Data

(60) Provisional application No. 62/628,338, filed on Feb. 9, 2018.

(51) Int. Cl.
| | |
|---|---|
| *B01D 63/10* | (2006.01) |
| *B01D 61/02* | (2006.01) |
| *B01D 61/08* | (2006.01) |
| *B01D 63/12* | (2006.01) |

(Continued)

(52) U.S. Cl.
CPC ......... *B01D 63/106* (2013.01); *B01D 61/025* (2013.01); *B01D 61/08* (2013.01); *B01D 63/12* (2013.01); *C02F 1/441* (2013.01); *B01D 2313/2011* (2022.08); *B01D 2313/21* (2013.01); *C02F 2103/08* (2013.01); *C02F 2201/006* (2013.01)

(58) Field of Classification Search
CPC .............. B01D 63/106; B01D 2313/20; B01D 2313/21
See application file for complete search history.

(56) References Cited

U.S. PATENT DOCUMENTS

| | | | |
|---|---|---|---|
| 4,419,241 A | 12/1983 | Hoffman | |
| 6,558,544 B1 * | 5/2003 | Eisberg | B01D 63/10 210/321.6 |
| 6,702,944 B2 | 3/2004 | Husain et al. | |

(Continued)

FOREIGN PATENT DOCUMENTS

| | | |
|---|---|---|
| CN | 203700064 | 7/2014 |
| CN | 105645519 | 6/2016 |

(Continued)

OTHER PUBLICATIONS

SBIR/STTR Interactive Topic Information System (SITIS); Advanced, Robust, and Simple Pretreatment to Reverse Osmosis; date last accessed Jan. 30, 2015; 4 pages; https://www.dodsbir.net/sitis/display_topic.asp?Bookmark=45897.

*Primary Examiner* — Jonathan M Peo
(74) *Attorney, Agent, or Firm* — Reinhart Boerner Van Deuren P.C.

(57) ABSTRACT

A sea water desalination system and reverse osmosis element for use in a desalination system are provided. The reverse osmosis element includes a body of media material having opposed first and second ends. First and second end cap assemblies are adjacent the first and second ends of the body. A shell of wound composite material encapsulates and retains the body and first and second end cap assemblies together to define an integrated pressure vessel. Methods of assembling are also provided.

21 Claims, 5 Drawing Sheets

(51) Int. Cl.
    *C02F 1/44*         (2023.01)
    *C02F 103/08*     (2006.01)

(56) References Cited

U.S. PATENT DOCUMENTS

| | | |
|---|---|---|
| 9,845,259 B2 | 12/2017 | Williams et al. |
| 10,441,908 B2 | 10/2019 | Fitzgerald |
| 2003/0024868 A1* | 2/2003 | Hallan .................. B01D 65/00 210/321.74 |
| 2011/0233126 A1* | 9/2011 | Prouty .................. B01D 61/10 210/232 |
| 2012/0037562 A1* | 2/2012 | Beppu .................. B01D 65/003 428/34.1 |
| 2013/0240434 A1* | 9/2013 | Yaeger ................. B01D 65/003 137/561 A |
| 2013/0334124 A1 | 12/2013 | Konishi et al. |
| 2016/0030862 A1 | 2/2016 | Wang |
| 2017/0274304 A1 | 9/2017 | You et al. |

FOREIGN PATENT DOCUMENTS

| | | |
|---|---|---|
| CN | 206463790 | 9/2017 |
| CN | 207324280 | 5/2018 |

\* cited by examiner

RO ELEMENT WITH INTEGRAL PRESSURE VESSEL

CROSS-REFERENCE TO RELATED PATENT APPLICATION

This patent application claims the benefit of U.S. Provisional Patent Application No. 62/628,338, filed Feb. 9, 2018, the entire teachings and disclosure of which are incorporated herein by reference thereto.

FIELD OF THE INVENTION

This invention generally relates to desalination systems and particularly to reverse osmosis elements for desalination systems.

BACKGROUND OF THE INVENTION

Desalination systems are often used in remote locations or during times of emergency to provide drinking water from sea water or other water with high salt content. Typically, these systems will use a reusable housing that has a thick heavy wall that can support the high pressures used during the desalination process. Typically end caps are provided to allow for a reverse osmosis element to be replaced from within the housing.

The reverse osmosis element is typically a generally cylindrical element that typically has an outer fiberglass wrap that secures anti-telescoping devices to opposed ends of the media material. The fiberglass wrap is wrapped around outer radial peripheries of the anti-telescoping devices and the media. The anti-telescoping devices prevent the media from telescoping under the pressures required for the desalination process.

In use, the housing provides structural support for the reverse osmosis element that is not met by the fiberglass wrap.

Unfortunately, the prior systems such as described above provide unnecessary weight and size which can make it more difficult to transport the desalination system to the location of use. Again, this is often a remote location or a location that may have experienced a resent natural disaster making transport more difficult.

The present invention provides improvements over the current state of the art.

BRIEF SUMMARY OF THE INVENTION

In one embodiment, a filter element, such as for use in a desalination system and for reverse osmosis, is provided. The filter element includes a body of media material, first and second end cap assemblies and a shell of wound composite material. The body of media material has opposed first and second ends. The first end cap assembly is at the first end of the body of media material. The second end cap assembly is at the second end of the body of media material. Each of the first and second end cap assemblies includes a first port for directing fluid into or out of the body of media material. The shell of wound composite material encapsulates and retains the body of media material and first and second end cap assemblies together to define an integrated pressure vessel.

In some embodiments, the integrated pressure vessel can withstand maximum pressures within the range of 700 to 1000 psig.

In some embodiments, the pressure vessel shell comprises a carbon fiber material.

In some embodiments, the shell retains the first and second end cap assemblies against the corresponding first and second ends of the body of media material.

In some embodiments, the media material is a wound media.

In some embodiments, each of the first and second end cap assemblies includes an anti-telescoping component having an inner end retained in direct contact with a corresponding one of the first and second ends of the wound media and an end cap retained against an outer end of the corresponding anti-telescoping component.

In some embodiments, the shell maintains the first and second end cap assemblies axially against the corresponding first and second ends of the body of media material.

In some embodiments, a permeate tube extending axially between first and second axial ends. The body of media material is a tube of media material oriented around the permeate tube with the first and second end portions of the permeate tube extending axially outward beyond the body of media material. At least one of the end cap assemblies including a clean fluid outlet port in fluid communication with a central cavity of the permeate tube.

In some embodiments, the shell of wound composite material has opposed first and second end portions. Each end portion defines an opening. The first end cap assembly includes a first portion and a second portion. The first portion has a smaller outer diameter than an outer diameter of the second portion. The first portion extends through the opening of the first end portion of the shell of wound composite material. The opening of the first end portion of the shell of wound composite material has an inner diameter that is smaller than the outer diameter of the second portion of the first end cap assembly. This limits axial movement of the end cap through the opening in a direction extending away from the media material. The second end cap includes a first portion and a second portion. The first portion has a smaller outer diameter than an outer diameter of the second portion. The first portion extends through the opening of the second end portion of the shell of wound composite material. The opening of the second end portion of the shell of wound composite material has an inner diameter that is smaller than the diameter of the second portion of the second end cap assembly. This limits axial movement of the end cap through the opening in a direction extending away from the media material.

In some embodiments, the first and second end portions of the shell axially retain the first and second end cap assemblies relative to and into axial engagement with the body of media material.

In some embodiments, the first port of each of the first and second end cap assemblies includes a first opening that is external of the shell.

In some embodiments, the first port of each of the first and second end cap assemblies includes a second opening that is within the shell and in fluid communication with an exterior of the body of media material, the first port extending between the first and second openings through the opening of the corresponding end portion of the shell of wound material.

In some embodiments, each of the first and second end cap assemblies includes an outer transition surface that transitions from the first portion to the second portion. The outer transition surfaces of the first and second end cap assemblies face axially away from one another. The transition surfaces cooperate with the first and second end portions of the shell to axially retain the first and second end cap assemblies relative to the body of media material.

In some embodiments, each of the first and second end portions of the shell of wound composite material includes an enlarged region that surrounds, at least in part, the second portion of the corresponding one of the first and second end caps. The enlarged portion has an inner diameter.

The shell of wound composite material includes a central region extending axially between the enlarged regions of the first and second end portions, the central region having an inner diameter that is smaller than the inner diameter of the enlarged regions but that is larger than the diameter of the openings of the first and second end portions of the shell of wound composite material.

In some embodiments, a first fitting is mounted to the first end cap assembly in surrounding relation of the first opening and provides a connector for fluidly connecting the first opening of the first end cap assembly to a first fluid conduit. A second fitting is mounted to the second end cap assembly in surrounding relation of the first opening and provides a connector for fluidly connecting the first opening of the second end cap assembly to a second fluid conduit.

In some embodiments, at least one of the first and second fittings is rotatably mounted to allow for adjustment of the relative positioning of the connectors of the first and second fittings.

In some embodiments, each of the first and second end cap assemblies has an abutment that abuts with a corresponding one of the first and second axial ends of the permeate tube to axially locate the first and second end cap assemblies relative to the body of media material.

In another embodiment, a filter element is provided. The filter element includes a body of media material having opposed ends; an end cap assembly at each end of the media material, each end cap assembly including a port for directing fluid into or out of the media material; and a carbon fiber shell encapsulating and retaining the body and end cap assemblies together, and defining an integrated pressure vessel.

In another embodiment, a method of assembling a filter element is provided. The method includes positioning first and second end cap assemblies adjacent to corresponding axial first and second ends of a body of media material. The method includes winding a composite material around the first and second end cap assemblies and body of media material to form a shell that encapsulates and retains the body of media material and first and second end cap assemblies together to define an integrated pressure vessel.

In one method, the method includes providing a permeate tube that extends axially between first and second ends within the body of media material. Positioning first and second end cap assemblies adjacent to corresponding axial first and second ends of the body of media material includes axially abutting the first end of the permeate tube against the first end cap assembly and abutting the second end of the permeate tube against the second end cap assembly.

In one method, the shell of wound composite material has opposed first and second end portions, each end portion defines an opening. The first end cap assembly includes a first portion and a second portion. The first portion has a smaller outer diameter than an outer diameter of the second portion. The first portion extends through the opening of the first end portion of the shell of wound composite material. The opening of the first end portion of the shell of wound composite material has an inner diameter that is smaller than the outer diameter of the second portion of the first end cap assembly. The second end cap includes a first portion and a second portion. The first portion has a smaller outer diameter than an outer diameter of the second portion. The first portion extends through the opening of the second end portion of the shell of wound composite material. The opening of the second end portion of the shell of wound composite material has an inner diameter that is smaller than the diameter of the second portion of the second end cap assembly.

In some embodiments of apparatus and methods, an intermediate layer, such a leak barrier, is provided between the shell and the various other components of the assembly. The intermediate layer may be applied along the full length or in specific locations between the shell and the other internal components. For example, the intermediate layer may be positioned between the shell and the end cap assemblies and/or between the shell and the body of media material.

In one implementation, the intermediate layer is located between the shell and the end cap assemblies proximate the transition to atmosphere to provide water tight integrity of the assembly with respect to atmosphere.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
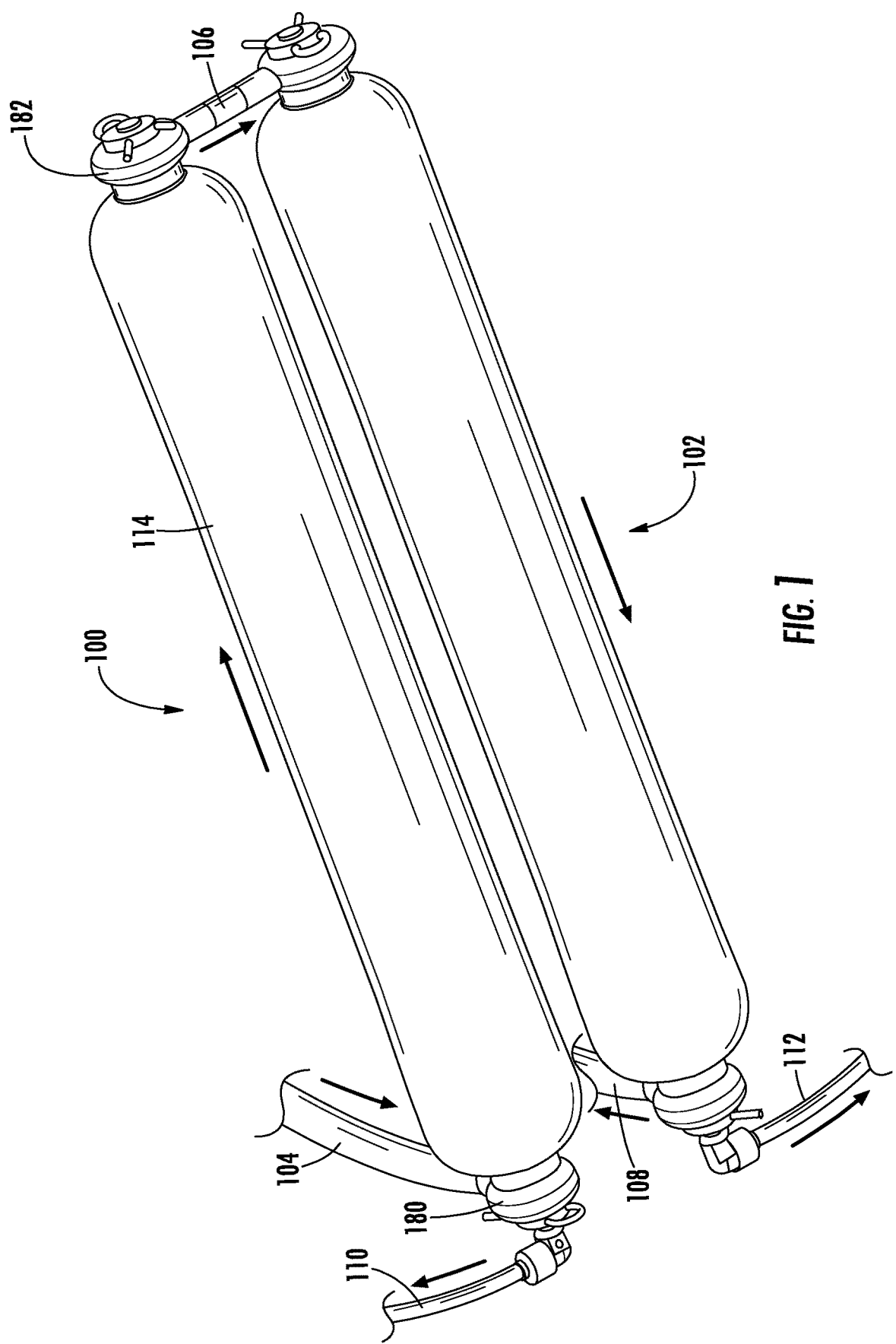
FIG. 1 is a perspective illustration of a seawater desalination system's reverse osmosis element array.

FIG. 1 illustrates a pair of filter elements in the form of reverse osmosis elements 100, 102 (also referred to herein as "RO elements") for desalinating seawater to provide clean water (also referred to herein as "permeate water", such as for drinking. The present RO elements find particular benefit in portable sea water desalination systems. The components for pumping the water to be desalinated through the elements 100, 102 and the clean water out of or away from the elements 100, 102 is not provided. Thus, the reduction of weight and size of the system is highly desirable as these systems are often transported to remote locations or places where some form of disaster has occurred making transport of heavy or large systems difficult.

The RO elements 100, 102 can be used alone or in combination of multiple elements as illustrated in FIG. 1. In the illustrated orientation, a desalination system is provided where the RO elements 100, 102 can be connected in series such that feed water is provided by supply conduit 104 is fed to a first RO elements 100 and the reject water exiting the first RO element 100 is fed to the second RO element 102 by connecting conduit 106. The reject water exiting the second RO element 102 can then be carried away by reject water conduit 108. The permeate water that has been desalinated can be carried away by permeate conduits 110, 112.

While two RO elements 100, 102 are illustrated more than two or less than two elements could be provided.

RO element 100 will be described in more detail. However, the description thereof is equally applicable to RO element 102.

Figure 2:
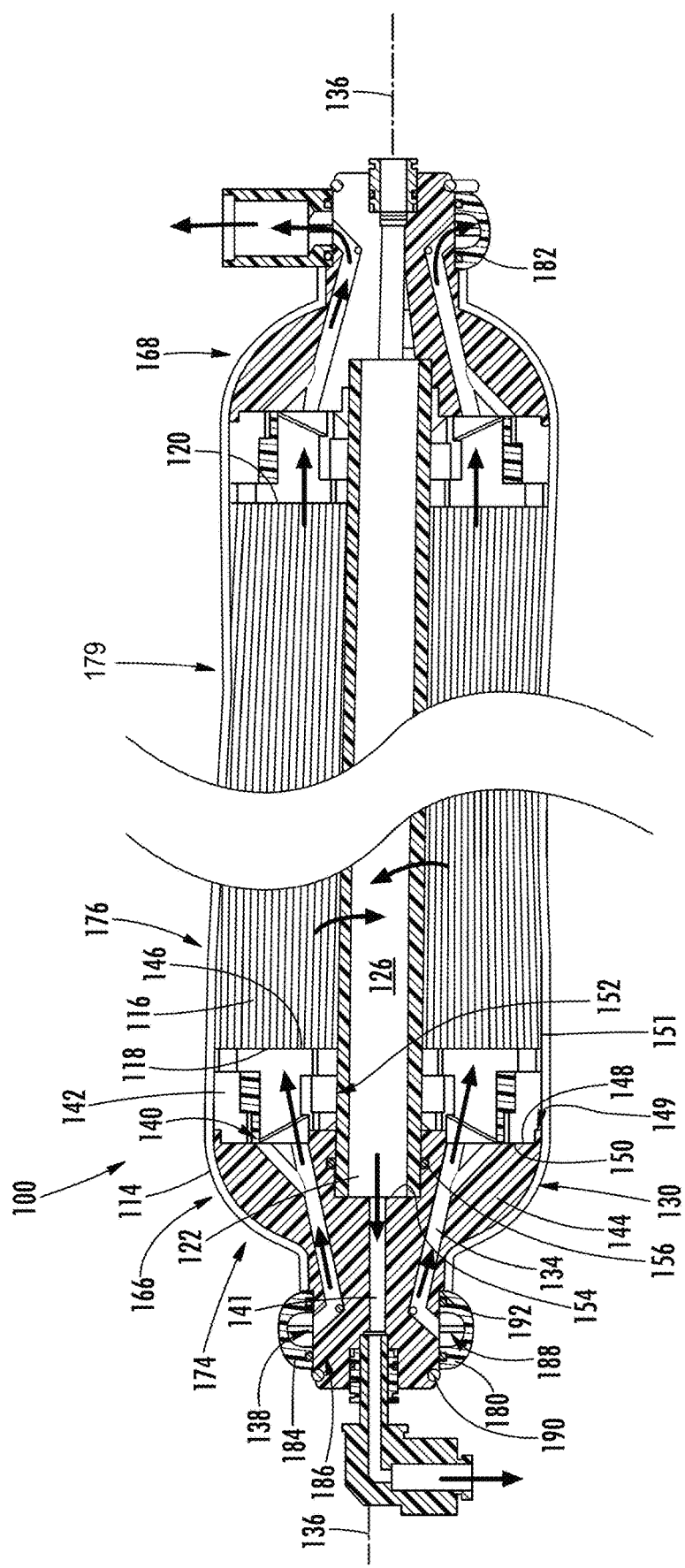
FIG. 2 is a partial cross-sectional illustration of a reverse osmosis element used in the system of FIG. 1.
Figure 3:
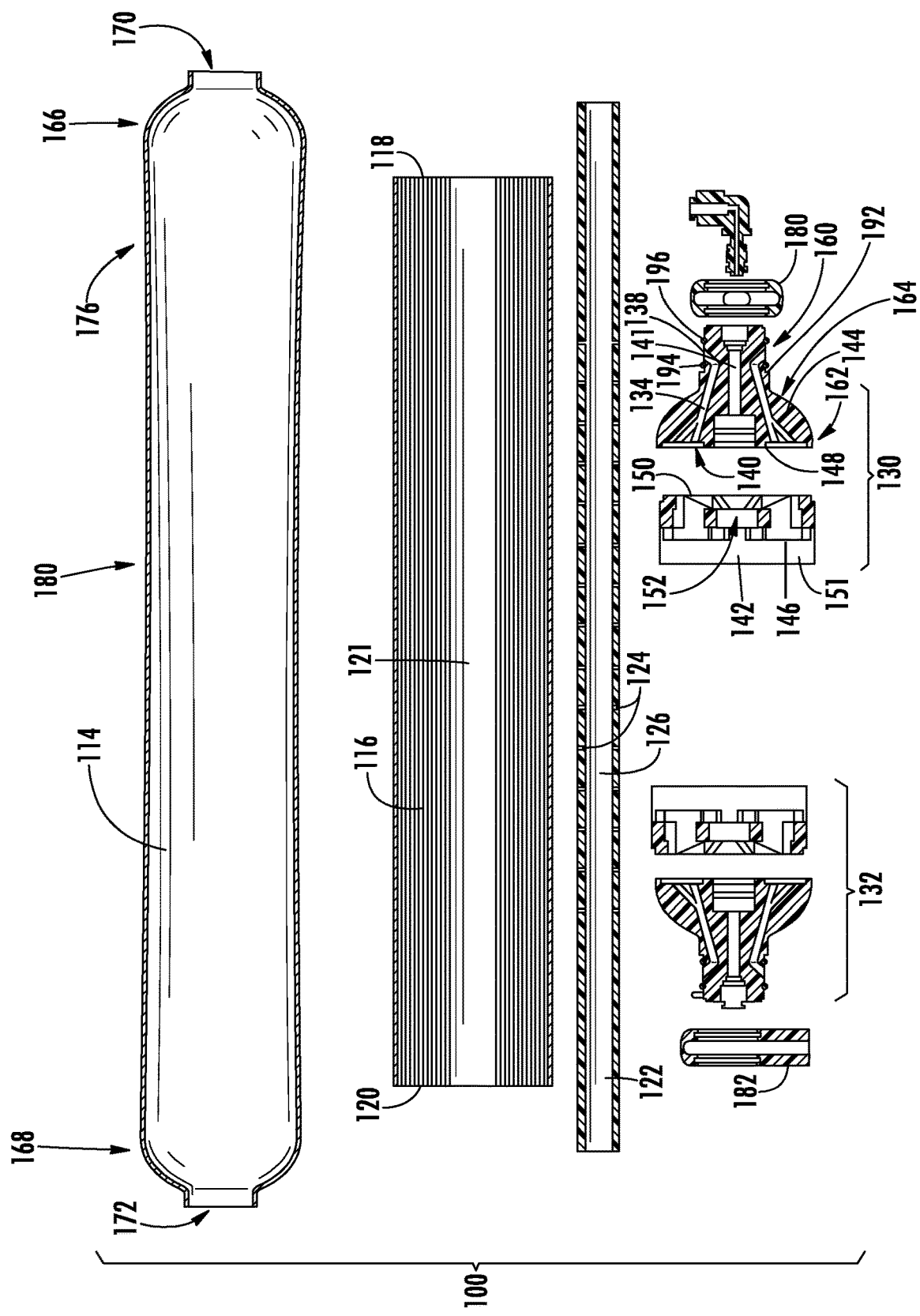
FIG. 3 is a cross-sectional and exploded illustration of the reverse osmosis element of FIG. 2.

With reference to FIGS. 2 and 3, RO element 100 is illustrated in cross-section. RO element 100 has a shell 114 formed from wound material. In one embodiment, the wound material is a composite material. In a more particular embodiment, the wound material is wound carbon fiber. In some embodiments, the width of the carbon fiber is between ¹⁄₂₀ of an inch and ⅛ of an inch and is preferably ¹⁄₁₆ of an inch in width, e.g. a direction perpendicular to the length of the carbon fiber as it is being applied.

The shell 114 is wound on and encapsulates a body of media material 116 that extends axially between opposed first and second ends 118, 120. The shell 114 forms an integral water and pressure tight outer shell. This configuration eliminates the need for insertion of the RO element into a separate pressure vessel (which are heavy and have complicated removable ends).

In one embodiment, the body of media material 116 is rolled reverse osmosis membrane, spacer, and wicking material.

The body of media material 116 is tubular defining an inner cavity 121 that receives a permeate tube 122 that has a plurality of apertures 124 formed through the sidewall thereof to allow permeate water exiting the body of media material 116 to flow into the central cavity 126 of permeate tube 122. The permeate tube extends axially between opposed first and second ends. End portions of the permeate tube, in the illustrated embodiment, extend axially outward beyond corresponding first and second ends 118, 120 of the body of media material 116. As such, the permeate tube 122 has an axial length that is greater than the axial length of the body of media material 116.

Figure 4:
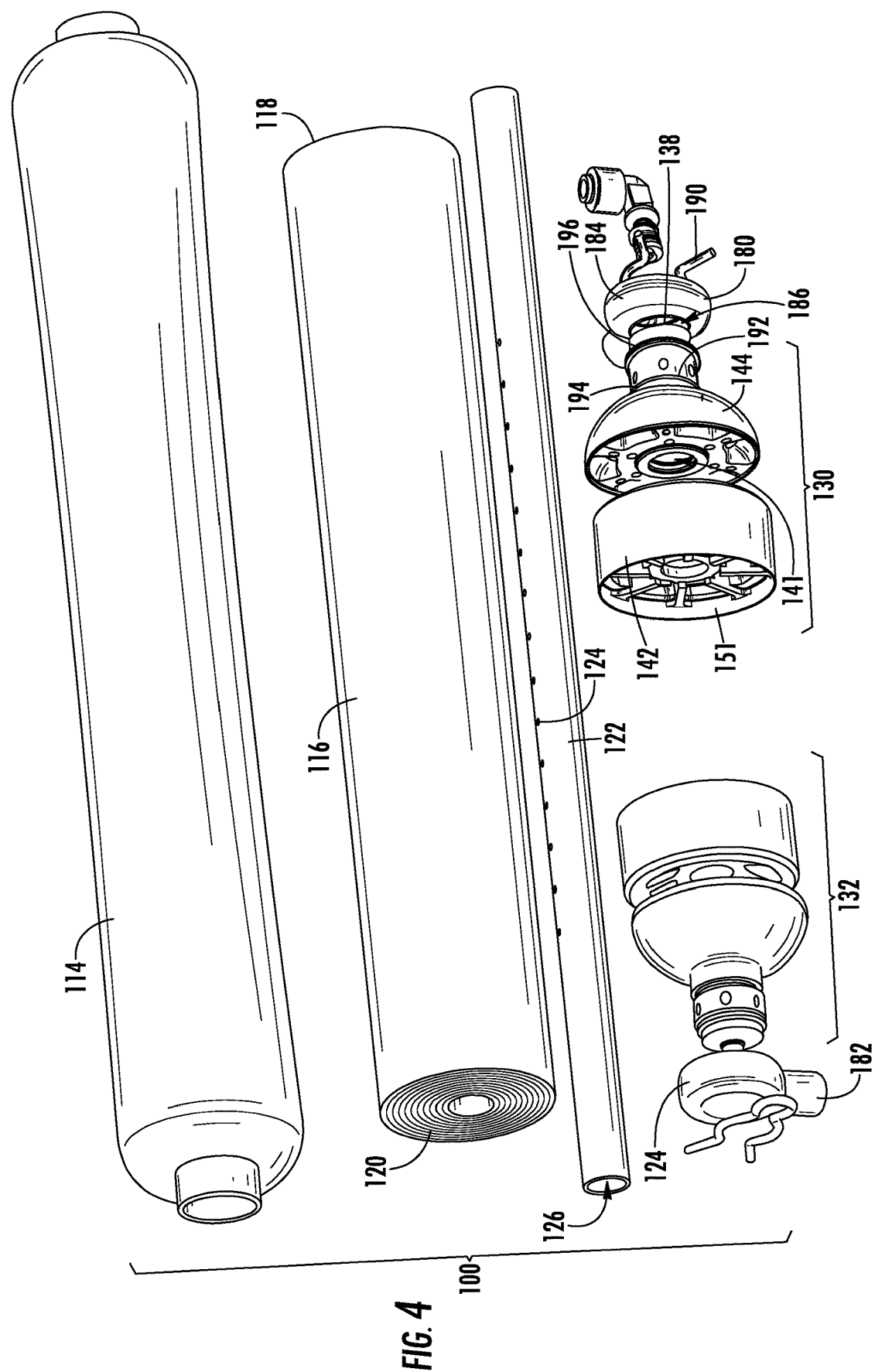
FIG. 4 is a perspective and exploded illustration of the reverse osmosis element of FIG. 3.
Figure 5:
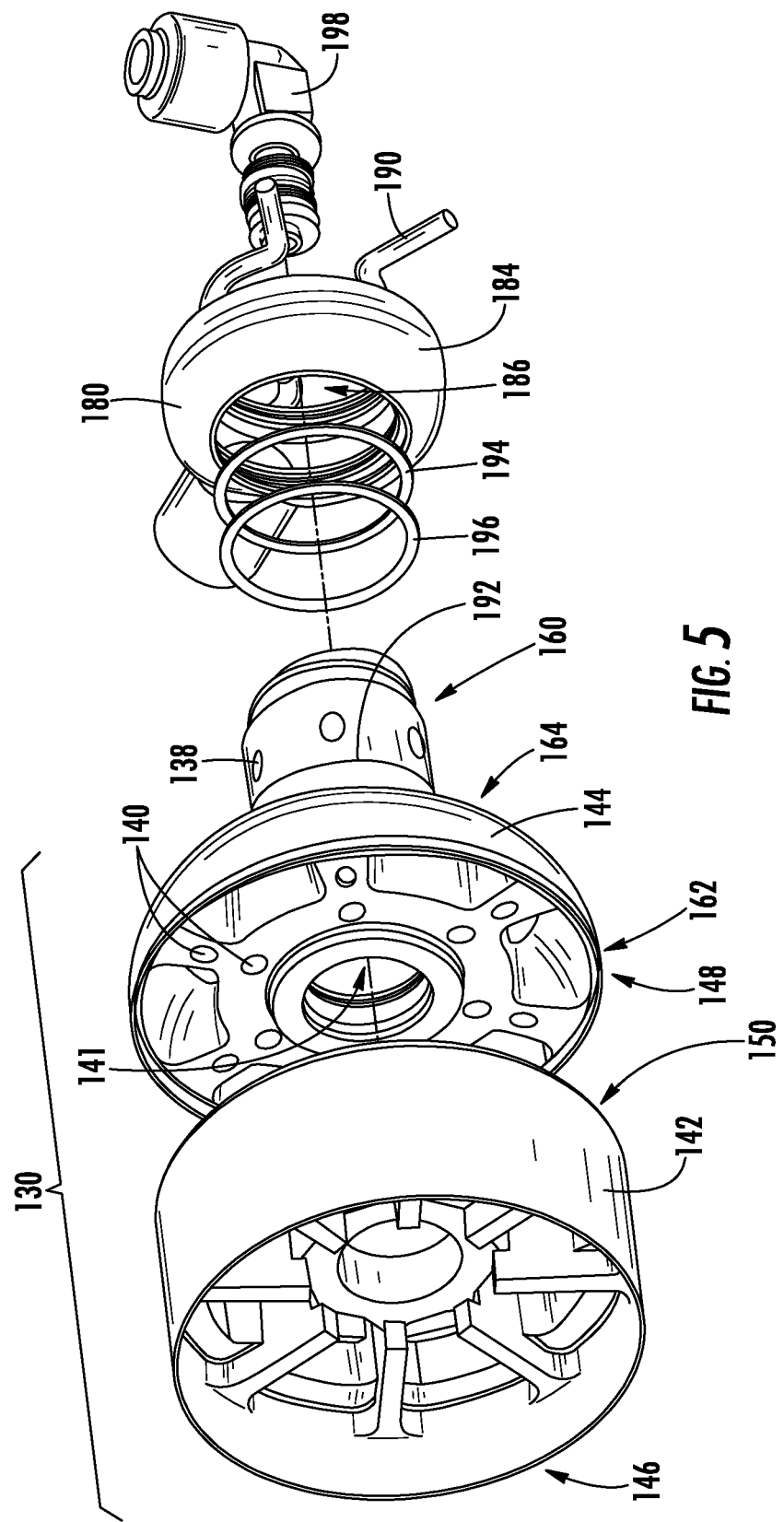
FIG. 5 is an enlarged partial illustration of an end cap assembly of the reverse osmosis element of FIG. 1.

With additional reference to FIGS. 4 and 5, the RO element includes first and second end cap assemblies 130, 132.

The first and second end cap assemblies 130, 132 are located adjacent to the corresponding first and second ends 118, 120 of the body of media material 116. The shell 114 maintains the end cap assemblies 130, 132 axially positioned relative to the body of media material 116. Thus, the shell 114, body of media material 116 and first and second end caps 130, 132 are maintained in an integral pressure vessel by way of the shell 114.

The first and second end cap assemblies 130, 132 are substantially identical and thus only first end cap assembly 130 will be described in detail with the details thereof equally applicable to second end cap assembly 132.

End cap assembly 130 includes at least one first port 134 for directing fluid into or out of the shell 114 and into communication with the body of media material 116. In this embodiment, the end cap assembly 130 includes a plurality of such ports angularly disposed about a central axis 136. Each port 134 includes first a first opening 138 that is located external of shell 114 and at least one second opening 140 that is located within shell 114. In this embodiment, multiple second openings 140 are provided that are radially spaced apart from one another to help fluid flow to and from the body of media material 116. Openings 140 are in fluid communication with the body of media material 116 and particularly an exterior thereof.

At least one of the end cap assemblies 130, 132 and in this embodiment both end cap assemblies 130, 132 includes a second port in the form of a clean fluid outlet port 141 through which clean fluid exits the RO element 100. The clean fluid outlet port 141 could also be referred to as a permeate water port. The clean fluid outlet port 141 in this embodiment is in fluid communication with central cavity 126 of permeate tube 122.

In the illustrated embodiment, end cap assembly 130 includes an anti-telescoping component 142 and an end cap 144. The anti-telescoping component 142 has an inner end 146 that is retained, operably, in direct axial contact with first end 118 of the body of media material 116. The anti-telescoping component 142 provides axial support to the body of media material 116 to prevent significant axial deformation of the body of media material 116 during operation due to the high pressures used for the desalination process.

An inner end 148 of the end cap 144 is retained in direct axial contact with an outer end 150 of the anti-telescoping component 142.

The anti-telescoping component 142 and end cap 144 may have a mating arrangement such as in the illustrated cooperating step and annular flange interface 149 that provides radial alignment between the two components. Additionally, the anti-telescoping component 142 may include an axially extending annular flange 151 (see FIG. 3) that axially receives an end portion of the body of media material 116 for radial alignment therebetween.

The shell 114 maintains the end cap 144 axially abutted against the anti-telescoping component 142 and the anti-telescoping component 142 axially abutted against the first end 118 of the body of media material 116.

While illustrated as separate components, the end cap assembly 130 could be a single component. However, due to the complex internal shapes and various ports, it is contemplated that manufacturing will be easier and more consistent using multiple components.

In this embodiment, the permeate tube 122 extends axially through a central opening 152 in the anti-telescoping component 142. An end of the permeate tube 122 is axially abutted against an abutment 154 in the form of a step of the end cap 144. A seal such as in the form of o-ring 156 may be provided between the end cap 144 and the end portion of the permeate tube 122 to prevent leakage therebetween and to fluidly seal the second port 141 to the central cavity 126 of the permeate tube.

The end cap assembly 130 includes a first portion 160, a second portion 162 and a transition region 164 therebetween. The first portion 160 has a smaller outer diameter than an outer diameter of the second portion 162. The transition region 164 transitions between the two different portions 160, 162. In the illustrated embodiment, the transition region has a curved transition surface. In other embodiments, the transition region 164 can be a simple step, a straight taper or combination of step, taper and/or curved surface. The transition regions and corresponding surfaces thereof face axially away from one another in the assembled RO element 100.

The shell 114 includes opposed first and second end portions 166, 168 proximate to and or forming axial ends of the shell 114. Each end portion 166, 168 defines a corresponding opening 170, 172.

The end cap 144 extends through opening 170 such that the first opening 138 thereof is located external of the shell 114 whit the second openings 140 thereof located within the shell 114 with the first port 134 extending between the first and second openings 138, 140 through opening 170.

In this embodiment, the outer diameter of the first portion 160 of the end cap 144 is substantially equal to the inner diameter of opening 170. This is due to the fact that opening 170 is formed by wrapping the wound material around the end cap 144 during formation of the RO element 100. Further, the inner diameter of opening 170 is smaller than outer diameter of the second portion 162. This configuration of having the opposed end portions 166, 168 and the oppositely facing transition regions of each end cap assemblies 130, 132 allows the shell 114 to retain the components in proper axial alignment relative to one another and secure the components into an integral pressure vessel, once it is in a hardened state, e.g. after it has cured.

The end portion 166 of shell 114 also has a first tapered region 174 that cooperates with and has an inner surface that has a corresponding shape as the transition region 164 of the end cap assembly 130. Again, this is due to the fact that shell 114 is shaped and formed by being a wrapped material that is wrapped around the end cap assemblies 130, 132 and the body of media material 116.

With the ends of the body of media material located within the annular flange 151, the outer diameter of the annular flange 151 is greater than the outer diameter of the body of media material 116. As such, the shell 114 will have a second tapered region 176 proximate each end where the shell 114 transitions from being wrapped around the end cap assembly 130 (particularly the anti-telescoping component 142) to being wrapped around the outer periphery of the body of media material 116.

Thus, the end portions of the shell 114 will have an enlarged region formed between the first and second tapered regions 174, 176. The enlarged region will have an inner diameter that is typically greater than an inner diameter of a central region 179 of the shell 114 that is formed around the body of media material 116 (e.g. between the enlarged regions of the opposed end portions 166, 168). However, the inner diameter of both the enlarged region and the central region will typically be greater than the inner diameter of opening 172.

In some embodiments, a separate layer of material may be located around the components such as the end cap assemblies 130, 132 and body of media material 116 before the outer shell 114 is formed by wrapping material around the components. As such, in this embodiment, the shell would not, at least in all locations, directly contact the end cap assemblies 130, 132 and the outer periphery of the body of media material 116. This intermediate layer of material may help the wrapping process by providing for better adhesion prior to the shell 114 hardening. Alternatively and/or in addition, this layer could also provide improved leak resistance.

The intermediate layer could take various forms. For instance, the intermediate layer could be in the form of a spray on coating or a shrink type material such as a tube of material that can shrink to form around the outer periphery of the filter element 100.

Further, the intermediate layer need not surround the entire length provided by the end cap assemblies 130, 132 and the body of media material 116. Instead, the intermediate layer may be provided only at part of this length, such as at the location between the interface between the end cap assemblies and the outer shell 114 that transitions to exposure to atmosphere, e.g. adjacent to the fittings 180, 182 discussed in more detail below.

A pair of fittings 180, 182 are mounted to the end cap assemblies 130, 132 that allow for fluidly connecting the RO element 100 to fluid conduits. In FIG. 1, the fittings 180, 182 allow for connecting RO element 100 to a source of sea water via conduit 104 and to the second RO element 102 via conduit 106.

The fittings are substantially identical and the description of one fitting will apply to the other fitting as well. With reference to FIGS. 1 and 2, fitting 180 includes an annular collar portion 184 that axially receives the first portion 160 of end cap assembly 130 through an aperture 186. The collar portion 184 includes an annular groove 188 on a radially inner surface thereof that defines, at least in part, aperture 186. When properly mounted, the groove 188 aligns with the openings 138 to allow for fluid communication between fitting 180 and port 134 to communicate fluid flow into or out of RO element 100.

The fitting 180 is attached to the end cap 144 by a retainer illustrated in the form of hair pin 190 received in a groove formed in an outer surface of the first portion 160. On an opposite axial side of the collar 184, the fitting 180 abuts axially against an abutment in the form of a radial step 192. As such, the collar 184, and therefore fitting 180, is axially located between hair pin 190 and radial step 192. A pair of o-rings 194, 196 on opposite axial sides of the openings 138 seal the collar 184 to the end cap 144 to prevent fluid leakage.

The fittings 180, 182 may have connections such as threaded connections for connecting to the corresponding conduits. Other connections are contemplated.

In some embodiments, one or both of the fittings 180, 182 are rotatably mounted to the corresponding end cap assemblies 130, 132 so that the relative orientation of the fittings 180, 182 can be adjusted to accommodate a particular installation.

In use, the RO element 100 can be easily replaced by simply disconnecting the fittings 180, 182 from a spent RO element and then attaching them to a new RO element.

A permeate water fitting 198 is inserted into the clean fluid outlet port 141 through which desalinated water exits the RO element 100. The fitting 198 again allows for easy disconnection of a spent RO element from the overall system and for mounting a new RO element.

The RO elements 100, 102 provide significant benefits over prior assemblies that used a heavy reusable pressure vessel with removable end caps. First, there is no need for removable end caps that require thick pressure vessel walls or bell ends. The carbon fiber construction's greater strength allows thinner outer shell wall. This allows for less parts, stronger materials and better design that provides for a smaller product and system.

Further, there is no need to open a vessel such as by removing end caps. Instead, the fittings 180, 182 are simply disconnected from the RO element and the new RO elements are attached.

To form the RO element, the body of media material 116 can be formed and mounted to the permeate tube 122 in a conventional manner Thereafter, the anti-telescoping component 142 can be glued to the permeate tube and taped to the end of the body of media material 116. Thereafter, the end cap 144 can be attached to the permeate tube 122 and positioned in axial abutment with the anti-telescoping component 142. Typically, the end cap 144 will be positioned such that the end of the permeate tube 122 axially abuts the end cap 144. The end cap 144 and anti-telescoping component 142 can then be taped together.

The taped assembly with the body of media material 116, the end cap assemblies 130, 132 and permeate tube 122 axially secured to one another is ready for the shell 114 to be wound around the outer periphery of the taped assembly. A high strength water tight composite filament is wound directly on the taped assembly. The shell 114 can be made of carbon fiber or other similar composite that meets the pressure and environmental requirements for a sea water RO element housing. The shell creates a permanent water and pressure tight seal around the RO element. The use of a high strength composite outer shell allows it to safely operate within seawater desalination pressures typically in the 700 to 1000 psig.

Feed, reject and permeate water can only enter and exit through specific passages in the end cap. The RO element with integral pressure vessel is extremely light weight and with a reduced foot print when compared to a standard RO element and pressure vessel. This is critical in application that require small portable RO desalination systems. There is a reduction in part and no pressure vessel assembly required.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
   i) a body of media material having opposed first and second ends;
   ii) first and second end cap assemblies, the first end cap assembly at the first end of the media material, the second end cap assembly at the second end of the media material, each of the first and second end cap assemblies including a first port for directing fluid into or out of the media material; and
   iii) a shell of wound composite material closely encapsulating and retaining the body of media material and first and second end cap assemblies together, and defining an integrated pressure vessel;
   wherein;
   the shell of wound composite material has opposed first and second end portions, each end portion defines an opening;
   the first end cap assembly includes a first portion and a second portion, the first portion having a smaller outer diameter than an outer diameter of the second portion, the first portion extending through the opening of the first end portion of the shell of wound composite material, the opening of the first end portion of the shell of wound composite material having an inner diameter that is smaller than the outer diameter of the second portion of the first end cap assembly;
   the second end cap assembly includes a first portion and a second portion, the first portion having a smaller outer diameter than an outer diameter of the second portion, the first portion extending through the opening of the second end portion of the shell of wound composite material, the opening of the second end portion of the shell of wound composite material having an inner diameter that is smaller than the outer diameter of the second portion of the second end cap assembly.

2. The filter element of claim 1, wherein the shell comprises a carbon fiber material.

3. The filter element as in claim 1, wherein the shell retains the first and second end cap assemblies against the corresponding first and second ends of the body of media material.

4. The filter element as in claim 1, wherein the media material is a rolled media.

5. The filter element as in claim 4, wherein each of the first and second end cap assemblies includes an anti-telescoping component having an inner end retained in direct contact with a corresponding one of the first and second ends of the rolled media, and an end cap retained against an outer end of the corresponding anti-telescoping component.

6. The filter element as in claim 5, wherein the shell maintains the first and second end cap assemblies axially against the corresponding first and second ends of the body of media material.

7. The filter element of claim 1, further comprising a permeate tube extending axially between first and second axial ends;
   wherein:
   the body of media material is a tube of media material oriented around the permeate tube with the first and second axial ends of the permeate tube extending axially outward beyond the body of media material;

at least one of the end cap assemblies including a clean fluid outlet port in fluid communication with a central cavity of the permeate tube.

8. The filter element of claim 1, wherein the first and second end portions of the shell axially retain the first and second end cap assemblies relative to and into axial engagement with the body of media material.

9. The filter element of claim 1, wherein the first port of each of the first and second end cap assemblies includes a first opening that is external of the shell, the first opening being a radially directed opening extending through a cylindrical portion.

10. The filter element of claim 9, wherein the first port of each of the first and second end cap assemblies includes a second opening that is within the shell and in fluid communication with an exterior of the body of media material, the first port extending between the first and second openings through the opening of the corresponding end portion of the shell of wound material.

11. The filter element of claim 1, wherein each of the first and second end cap assemblies includes an outer transition surface that transitions from the first portion to the second portion, the outer transition surfaces of the first and second end cap assemblies face axially away from one another, the transition surfaces cooperate with the first and second end portions of the shell to axially retain the first and second end cap assemblies relative to the body of media material.

12. The filter element of claim 1, wherein:
each of the first and second end portions of the shell of wound composite material includes an enlarged region that surrounds, at least in part, the second portion of the corresponding one of the first and second end caps, the enlarged portion has an inner diameter;
the shell of wound composite material includes a central region extending axially between the enlarged regions of the first and second end portions, the central region having an inner diameter that is smaller than the inner diameter of the enlarged regions but that is larger than a diameter of the opening of the first and second end portion of the shell of wound composite material and that is larger than a diameter of the opening of the second end portion of the shell of wound composite material.

13. The filter element of claim 9, further comprising:
a first fitting mounted to the first end cap assembly in surrounding relation of the first opening and providing a connector for fluidly connecting the first opening of the first end cap assembly to a first fluid conduit, the first fitting includes a collar portion that receives the cylindrical portion of the first end cap assembly, the collar portion including an annular groove formed on a radially inner surface of the collar portion, the annular groove aligns with the radially directed opening in the cylindrical portion of the first end cap assembly;
a second fitting mounted to the second end cap assembly in surrounding relation of the first opening and providing a connector for fluidly connecting the first opening of the second end cap assembly to a second fluid conduit, the second fitting includes a collar portion that receives the cylindrical portion of the second end cap assembly, the collar portion including an annular groove formed on a radially inner surface of the collar portion, the annular groove aligns with the radially directed opening in the cylindrical portion of the second end cap assembly.

14. The filter element of claim 13, wherein at least one of the first and second fittings is rotatably mounted to allow for adjustment in relative positioning of the connectors of the first and second fittings, wherein rotating the at least one of the first and second fittings does not adjust an axial position of the at least one of the first and second fittings.

15. The filter element of claim 1, wherein the shell of wound composite material permanently encapsulates and retains the body of media material and first and second end cap assemblies together such that the end cap assemblies are not removable from the shell.

16. A filter element comprising:
 i) a body of media material having opposed first and second ends;
 ii) first and second end cap assemblies, the first end cap assembly at the first end of the media material, the second end cap assembly at the second end of the media material, each of the first and second end cap assemblies including a first port for directing fluid into or out of the media material; and
 iii) a shell of wound composite material closely encapsulating and retaining the body of media material and first and second end cap assemblies together, and defining an integrated pressure vessel;
further comprising a permeate tube extending axially between first and second axial ends;
wherein:
the body of media material is a tube of media material oriented around the permeate tube with the first and second axial ends of the permeate tube extending axially outward beyond the body of media material;
at least one of the end cap assemblies including a clean fluid outlet port in fluid communication with a central cavity of the permeate tube; and
wherein each of the first and second end cap assemblies has an abutment that abuts with a corresponding one of the first and second axial ends of the permeate tube to axially locate the first and second end cap assemblies relative to the body of media material.

17. A filter element comprising:
 i) a body of media material having opposed ends;
 ii) an end cap assembly at each end of the media material, each end cap assembly including a port for directing fluid into or out of the media material; and
 iii) a carbon fiber shell closely encapsulating and retaining the body and end cap assemblies together, and defining an integrated pressure vessel;
wherein;
the carbon fiber shell has opposed first and second end portions, each end portion defines an opening;
the first end cap assembly includes a first portion and a second portion, the first portion having a smaller outer diameter than an outer diameter of the second portion, the first portion extending through the opening of the first end portion of the shell of wound composite material, the opening of the first end portion of the shell of wound composite material having an inner diameter that is smaller than the outer diameter of the second portion of the first end cap assembly
the second end cap assembly includes a first portion and a second portion, the first portion having a smaller outer diameter than an outer diameter of the second portion, the first portion extending through the opening of the second end portion of the shell of wound composite material, the opening of the second end portion of the shell of wound composite material having an inner diameter that is smaller than the outer diameter of the second portion of the second end cap assembly.

18. The filter element of claim 17, wherein the carbon fiber shell permanently encapsulates and retains the body of media material and first and second end cap assemblies together such that the end caps are not removable from the carbon fiber shell.

19. A method of assembling a filter element comprising:
positioning first and second end cap assemblies adjacent to corresponding axial first and second ends of a body of media material; and
winding a composite material around the first and second end cap assemblies and body of media material to form a shell of wound composite material that encapsulates and retains the body of media material and first and second end cap assemblies together to define an integrated pressure vessel;
wherein:
the shell of wound composite material has opposed first and second end portions, each end portion defines an opening;
the first end cap assembly includes a first portion and a second portion, the first portion having a smaller outer diameter than an outer diameter of the second portion, the first portion extending through the opening of the first end portion of the shell of wound composite material, the opening of the first end portion of the shell of wound composite material having an inner diameter that is smaller than the outer diameter of the second portion of the first end cap assembly;
the second end cap assembly includes a first portion and a second portion, the first portion having a smaller outer diameter than an outer diameter of the second portion, the first portion extending through the opening of the second end portion of the shell of wound composite material, the opening of the second end portion of the shell of wound composite material having an inner diameter that is smaller than the outer diameter of the second portion of the second end cap assembly.

20. The method of claim 18, comprising:
providing a permeate tube that extends axially between first and second ends within the body of media material; and
wherein positioning first and second end cap assemblies adjacent to corresponding axial first and second ends of the body of media material includes axially abutting the first end of the permeate tube against the first end cap assembly and abutting the second end of the permeate tube against the second end cap assembly.

21. The method of claim 19, wherein winding the composite material around the first and second end cap assemblies and body of media material to form a shell of wound composite material that encapsulates and retains the body of media material and first and second end cap assemblies together to define an integrated pressure vessel such that the end cap assemblies are not removable from the shell.

* * * * *

UNITED STATES PATENT AND TRADEMARK OFFICE
CERTIFICATE OF CORRECTION

| | |
|---|---|
| PATENT NO. | : 12,251,664 B2 |
| APPLICATION NO. | : 16/271342 |
| DATED | : March 18, 2025 |
| INVENTOR(S) | : Steven T. Yoshimura |

It is certified that error appears in the above-identified patent and that said Letters Patent is hereby corrected as shown below:

In the Claims

Column 11, Line 39 Claim 12 reads:
"a diameter of the opening of the first and second end"
Should read:
--a diameter of the opening of the first end--

Column 12, Line 58 Claim 17 reads:
"portion of the first end cap assembly"
Should read:
--portion of the first end cap assembly;--

Column 14, Line 10 Claim 20 reads:
"the method of claim 18, comprising;"
Should read:
--the method of claim 19, comprising;--

Signed and Sealed this
Thirteenth Day of May, 2025

Coke Morgan Stewart
*Acting Director of the United States Patent and Trademark Office*